United States Patent [19]

Tomita

[11] Patent Number: 5,401,526
[45] Date of Patent: Mar. 28, 1995

[54] JELLY HEALTH FOODS CONTAINING ODORLESS GARLIC AND PROCESS FOR MANUFACTURING SAME

[76] Inventor: Mieko Tomita, 13-9-806, Denenchofu-minami, Ohta-ku, Tokyo, Japan

[21] Appl. No.: 87,497

[22] Filed: Jul. 2, 1993

[30] Foreign Application Priority Data

Apr. 27, 1993 [JP] Japan .................. 5-101528
Apr. 27, 1993 [JP] Japan .................. 5-101529

[51] Int. Cl.⁶ .............................. A23L 1/06
[52] U.S. Cl. ................... 426/615; 426/518; 426/519; 426/616; 426/638; 426/639
[58] Field of Search ............ 426/573, 518, 519, 616, 426/638, 639, 646, 615

[56] References Cited

U.S. PATENT DOCUMENTS

| | | | |
|---|---|---|---|
| 4,649,052 | 3/1987 | Sumi et al. | 426/49 |
| 4,741,914 | 5/1988 | Kimizuka et al. | 426/638 |

FOREIGN PATENT DOCUMENTS

| | | | |
|---|---|---|---|
| 35-2894 | 3/1960 | Japan . | |
| 38-14392 | 8/1963 | Japan . | |
| 57-198065 | 12/1966 | Japan . | |
| 42-27308 | 12/1967 | Japan . | |
| 48-13568 | 4/1973 | Japan . | |
| 48-28658 | 4/1973 | Japan . | |
| 49-48862 | 5/1974 | Japan . | |
| 50-19936 | 3/1975 | Japan . | |
| 50-77560 | 6/1975 | Japan . | |
| 015655 | 5/1977 | Japan . | |
| 53-130455 | 11/1978 | Japan . | |
| 56-164762 | 12/1981 | Japan . | |
| 57-29265 | 2/1982 | Japan . | |
| 59-210864 | 11/1984 | Japan . | |
| 62-100259 | 9/1987 | Japan . | |
| 64-13964 | 1/1989 | Japan . | |
| 1-265862 | 5/1989 | Japan . | |
| 2016948 | 1/1990 | Japan | 426/616 |

Primary Examiner—Helen Pratt
Attorney, Agent, or Firm—W. Patrick Bengtsson

[57] ABSTRACT

Odorless garlic, which is obtained by cooking whole or peeled garlic under pressure, impasting the cooked garlic and treating the impasted garlic with the juice of citrus and honey respectively to deodorize garlic, a process for manufacturing the odorless garlic, jelly health foods containing the odorless garlic and a process for manufacturing the jelly health foods containing the odorless garlic.

10 Claims, No Drawings

JELLY HEALTH FOODS CONTAINING ODORLESS GARLIC AND PROCESS FOR MANUFACTURING SAME

FIELD OF THE INVENTION

This invention relates to deodorized garlic, a process for manufacturing the deodorized garlic, jelly health foods such as jam, marmalade or the like using the deodorized garlic and a process for manufacturing garlic jelly health foods.

BACKGROUND OF THE INVENTION

Garlic has been used for food for a long time for the purpose of nutrition, medical use, etc. However, the range of its utilization for food has been limited narrowly because of its strong odor.

Various attempts have been made to remove the odor peculiar to garlic.

Examples of the attempts are as follows:

(1) Removing garlic odor constituents by treatment using enzymes or agents, which involves (a) treatment using a fermentation product (see Japanese Patent Publication Nos. 2,894/1960, 14,392/1963 and 27,308/1967); (b) treatment using agents such as pyroligneous acid (see Japanese Patent Application Laid-open No. 19,936/1975); (c) an aqueous solution of acetic acid (see Japanese Patent Application Laid-open No. 130,455/1978); (d) phytic acid and silicic acid sol (see Japanese Patent Application Laid-open No. 29,265/1982); and (e) a menthol-containing solution (see Japanese Patent Application Laid-open No. 13,964/1989), etc.

(2) forcibly removing garlic odor constituents by treating garlic water extract with resins, active carbon or steam (see Japanese Patent Application Laid-open Nos. 210,864/1984 and 100,259/1987), extraction with alcohol and the like, etc.

(3) Deodorizing garlic by inactivating allinase, an enzyme involved in the formation of garlic odor, by heat inactivating the enzyme with (a) a hot blast (see Japanese Patent Application Laid-open No. 77,560/1975), (b) steam-cooking (see Japanese Patent Application Laid-open No. 198,065/1982), (c) boiling (see Japanese Patent Application Laid-open No. 115,947/1976 and Japanese Patent Publication No. 12,658/1966), (d) treatment using oil at high temperature (see Japanese Patent Application Laid-open No. 28,658/1973), (e) baking (see Japanese Patent Application Laid-open No. 265,862/1989), (f) electromagnetic wave heating (see Japanese Patent Application Laid-open Nos. 18,568/1973, 48,862/1974 and 164,762/1981), etc.

Even by these various methods, however, it is very difficult to remove the odor of garlic completely without degenerating the constituents of garlic. Accordingly, the addition of deodorized garlic to health foods without generating the, constituents of garlic has not been successful.

Jelly foods such as jam and marmalade are produced by adding 50–80% saccharide to raw materials (strawberry, apple, etc.), boiling the material down and adding a gelling agent, a sour agent or the like for finishing. However, these foods contain and are not preferable compared to modern health foods.

Saccharide is digested and absorbed in the body to convert into heat and kinetic energy. Vitamin $B_1$ is thought to be indispensable for this conversion. Therefore, the addition of garlic containing vitamin $B_1$ is not only considered to be nutritionally preferable for these foods but also is considered to make these foods desirable as health foods owing to the healthy action of garlic constituents.

Jam, marmalade or the like is a preferred food as it maintains the relatively pure taste of its raw material. It is difficult to completely remove the odor of garlic although the addition of garlic to various health foods had been studied. However, an attempt to add garlic to foods such as jam, marmalade, etc. has not been studied at all.

PROBLEMS TO BE SOLVED BY THE PRESENT INVENTION

This invention provides completely deodorized garlic which can be added to various foods and which can be used as a raw material for various foods. In addition, the invention provides a process for manufacturing deodorized garlic, and jelly foods for health foods using the completely deodorized garlic.

SUMMARY OF THE INVENTION

In order to attain the above object, the present inventors studied garlic intensively. The instant invention discloses completely deodorized garlic, a process for manufacturing the same, and jelly foods desirable as health foods using the completely deodorized garlic.

That is, a primary purpose of the present invention lies in providing odorless garlic which is obtained by cooking whole or peeled garlic under pressure, impasting the cooked garlic and treating the impasted garlic with the juice of citrus and honey respectively to remove the odor of garlic.

Another purpose of the present invention lies in providing a process for manufacturing odorless garlic, comprising cooking whole or peeled garlic under pressure, impasting the cooked garlic and treating the impasted garlic with the juice of citrus and honey respectively.

Still another purpose of the present invention lies in providing odorless garlic-containing jelly health foods obtained by adding the above odorless garlic to raw materials of jelly foods.

Still another purpose of the present invention lies in providing a process for manufacturing odorless garlic-containing jelly health foods, comprising adding the above odorless garlic to raw materials of jelly foods in the process of manufacturing the jelly foods.

DETAILED DESCRIPTION OF THE PREFERRED EMBODIMENT

Hereinafter, the present invention will be described in detail.

(1) Manufacture of Odor less Garlic

Odorless garlic is manufactured by cooking whole or peeled garlic under pressure, impasting the cooked garlic and then treating the impasted garlic with juice of citrus and honey respectively.

It is sufficient that the above pressure cooking treatment is carried out generally at a pressure of about 1 atm at a temperature of about 120° C. The treatment time therefor is generally several minutes, preferably about 1-2 minutes. By this pressure cooking treatment, an irritating odor of garlic is removed.

In order to impaste the pressurizedly cooked garlic, various suitable means may be adopted and the garlic may be mashed.

The treatment of the impasted garlic with the juice of citrus and honey is carried out by homogeneously mixing the impasted garlic with the juice of citrus or honey at a fixed ratio.

The mixing ratios of the juice of citrus and honey can be varied, depending upon the purpose of use of garlic. Generally, it is preferred that the mixing ratio of garlic to the juice of citrus is 5:1 by weight and that of garlic to honey is 1:1 by weight.

In the treatments with the juice of citrus and honey, the impasted garlic is first mixed with the juice of citrus to permeate the juice into the impasted garlic sufficiently, and then honey is mixed thereinto thoroughly. However, the order of the treatment with the juice of citrus and that with honey may be reversed.

Various citrus such as a lemon, a summer orange, grape fruit, etc. can be used in the instant invention. In view of the connection with deodorization, the juice of a lemon is particularly preferable.

According to these treatments with the juice of citrus and honey, an offensive odor which still remains even after the pressurized cooking of garlic is removed completely. As a result of this treatment, it thus becomes possible to use such garlic as raw materials of various foods.

The garlic to be used in the present invention is completely free from its odor. Therefore, the garlic of the instant invention can be used for foods such as jam or marmalade since it is preferred to keep the pure taste of the raw material.

(2) Manufacture of Jelly Foods

In order to manufacture jelly foods containing odorless garlic, the odorless garlic is first manufactured according to the above process.

On the other hand, raw materials of the jelly foods such as fruits and the like are mixed with any saccharide and boiled down. When the boiled down materials begin to have substantially the same viscosity as the paste of the above odorless garlic, both are mixed and further boiled down into jelly foods.

As saccharides to be used for the manufacture of the above jelly foods, sugar, thick malt syrup, reducing maltose, invertose, etc. can be used.

According to the present invention, not only completely deodorized garlic can be provided but also it becomes possible to use the same as a raw material of such a type of food like jam or marmalade as is preferred to give a pure taste. In addition, it becomes possible by the odorless garlic to provide such a type of jelly food as is desirable for a health food.

Furthermore, the present odorless garlic paste can be utilized as a preservative. Health foods can be preserved for several months without using a preservative by an antiseptic action of garlic. For example, jam manufactured by adding this odorless garlic, though the preservation period of jam is generally 1 month, is not denatured even after it is left for 4 months.

This preservative effect is given not by garlic alone but prominently by the addition of odorless garlic prepared by adding lemon and honey to garlic, so that it seems that there are some interaction between these ingredients.

EXAMPLES

Hereinafter, the present invention will be described more specifically, referring to examples. However, the technical scope of the present invention is not restricted to the examples.

EXAMPLE 1

Manufacture of Odorless Garlic (1)

500 g of unpeeled whole garlic was placed in a steam pressure cooker and cooked at a pressure of 1 atm at 120° C. for about 2 minutes. After mashing to impaste the cooked garlic, 10 cc of lemon juice was thoroughly mixed into the garlic paste. Thereafter, 500 g of honey was added to the mixture, followed by stirring to a homogeneous state.

Thus manufactured garlic paste was odorless garlic from which an offensive odor had been completely removed.

EXAMPLE 2

Manufacture of Odorless Garlic (2)

500 g of peeled garlic was placed in a steam pressure cooker as it is and cooked at a pressure of 1 atm at 120° C. for about 2 minutes. After mashing to impaste the cooked garlic, 100 cc of summer orange juice was thoroughly mixed permeate into the garlic paste. Thereafter, 450 g of honey was added to the mixture, followed by stirring to the homogeneous state.

Thus manufactured garlic paste was completely deodorized.

EXAMPLE 3

Manufacture of Apple Jam

Using garlic manufactured in the above Example 1, jam was manufactured. Raw materials and their mixing ratios were as follows:

| | |
|---|---|
| Apple | 500 g |
| Garlic | 50 g |
| Lemon Juice | 30 cc |
| Honey | 50 g |
| Saccharides (sugar) | 250 g |

Using 50 g of garlic 10 cc of lemon juice and 50 g of honey, odorless garlic was manufactured according to the process disclosed in the above Example 1. On the other hand, 20 cc of lemon juice and 250 g of saccharides (sugar) were added to 500 g of sliced apples, followed by boiling down. When the boiled-down apple came to have substantially the same concentration as the odorless garlic, the both were mixed and further boiled down to manufacture a product.

This jam had a refreshing taste without giving an offensive odor of garlic.

EXAMPLE 4

Manufacture of Strawberry Jam

Strawberry jam was manufacture in the same manner as in Example 3, except that strawberries were used for raw materials instead of apples.

EXAMPLE 5

Manufacture of Marmalade

Using raw materials set forth below and odorless garlic manufactured in the same manner as in Example 3, marmalade was manufactured also in the same manner as in Example 3. Raw materials and their mixing ratios were as follows:

| | |
|---|---|
| Summer orange | 400 g |
| Saccharides (sugar) | 350 g |
| Garlic | 50 g |
| Lemon Juice | 10 cc |
| Honey | 50 g |
| Water | 200 cc |

This marmalade was manufactured as follows. The skin of summer orange was cut into fine strips and boiled together with summer orange juice and 200 cc of water. To this mixture, 350 g of sugar was added and further boiled down. When thus boiled-down material came to have substantially the same viscosity as the above odorless garlic, both were mixed and further boiled down to obtain marmalade.

What is claimed is:

1. An odorless garlic composition consisting essentially of cooked mashed garlic and an amount of citrus juice and honey effective to produce an odorless garlic composition.

2. A process for manufacturing an odorless garlic composition consisting essentially of cooked mashed garlic and an amount of citrus juice and honey effective to produce an odorless garlic composition, comprising cooking garlic under pressure, mashing the cooked garlic and treating the mashed garlic with an amount of citrus juice and honey effective to produce said odorless garlic composition.

3. Jelly health foods comprising the odorless garlic of claim 1.

4. A process for manufacturing jelly health foods containing odorless garlic, comprising manufacturing odorless garlic according to claim 2 and adding the odorless garlic to raw materials of jelly foods.

5. The process of claim 2 wherein said pressure is at least 1 atmosphere and said temperature is at least 120° C.

6. The process of claim 2 wherein said garlic is cooked for a period of at least 1 minute.

7. The process of claim 2 wherein the weight ratio of cooked mashed garlic to citrus juice is about 5:1.

8. The process of claim 2 wherein the weight ratio of honey to mashed cooked garlic is from about 0.9:1 to 1:1.

9. The process of claim 2 wherein said garlic is whole garlic.

10. The process according to claim 9 further comprising peeling said whole garlic.

* * * * *